US010033252B2

(12) United States Patent
Rozman et al.

(10) Patent No.: US 10,033,252 B2
(45) Date of Patent: Jul. 24, 2018

(54) SENSORLESS CONTROL OF A DC SYNCHRONOUS MACHINE

(71) Applicant: Hamilton Sundstrand Corporation, Charlotte, NC (US)

(72) Inventors: Gregory I. Rozman, Rockford, IL (US); Steven J. Moss, Rockford, IL (US); Jacek F. Gieras, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 538 days.

(21) Appl. No.: 14/685,879

(22) Filed: Apr. 14, 2015

(65) Prior Publication Data
US 2016/0308423 A1    Oct. 20, 2016

(51) Int. Cl.
| H02K 11/00 | (2016.01) |
| H02P 6/10 | (2006.01) |
| H02P 6/14 | (2016.01) |
| H02K 11/33 | (2016.01) |
| H02P 6/182 | (2016.01) |
| H02P 9/30 | (2006.01) |
| H02P 9/48 | (2006.01) |

(52) U.S. Cl.
CPC .............. *H02K 11/33* (2016.01); *H02P 6/182* (2013.01); *H02P 9/302* (2013.01); *H02P 9/48* (2013.01)

(58) Field of Classification Search
CPC .................................. H02K 11/33; H02P 9/48
USPC .............. 310/68 D, 68 E; 318/400.2; 363/74
See application file for complete search history.

(56) References Cited

U.S. PATENT DOCUMENTS

| 6,583,593 B2 | 6/2003 | Iijima et al. |
| 7,034,497 B2 | 4/2006 | Markunas et al. |
| 8,148,866 B2 | 4/2012 | Shah |
| 8,593,095 B2 | 11/2013 | Markunas et al. |
| 2009/0012742 A1* | 1/2009 | Eldery .................... H02P 6/182 |
| | | 702/151 |
| 2010/0148712 A1* | 6/2010 | Klatt ........................ B60Q 1/30 |
| | | 318/400.42 |
| 2013/0193888 A1 | 8/2013 | Markunas |
| 2014/0266078 A1 | 9/2014 | Rozman et al. |
| 2014/0266079 A1 | 9/2014 | Rozman et al. |
| 2014/0285053 A1 | 9/2014 | Himmelmann |

FOREIGN PATENT DOCUMENTS

| EP | 2621081 | 7/2013 |
| JP | 2008072886 | 3/2008 |
| WO | 8603907 | 7/1986 |
| WO | 0067355 | 11/2000 |

OTHER PUBLICATIONS

European Search Report for European Patent Application No. 16165111 completed Aug. 2, 2016.

\* cited by examiner

*Primary Examiner* — Jose Gonzalez Quinone
(74) *Attorney, Agent, or Firm* — Carlson, Gaskey & Olds, P.C.

(57) ABSTRACT

An assembly for operating a DC synchronous machine according to an exemplary aspect of the present disclosure includes, among other things, a controller that is configured to determine a position of a rotating portion utilizing a carrier signal, adjust current supply to a field winding, and monitor and adjust operation of the DC synchronous machine based on various electrical parameters relating to the carrier signal. A method for operating a DC synchronous machine is also disclosed.

15 Claims, 8 Drawing Sheets

SENSORLESS CONTROL OF A DC SYNCHRONOUS MACHINE

BACKGROUND

This disclosure relates generally to a synchronous machine, and more specifically to a control system for synchronizing current supply with rotor position.

Synchronous machines are known. Synchronous machines include a stationary portion and a rotating portion, where the rotating portion and the stationary portion each have at least one winding.

One application of synchronous machines is a starter/generator arrangement for gas turbine engines. Synchronous starter/generators are configured to function as a motor to first start a gas turbine engine. Once the engine is running, the synchronous starter/generator can be shifted to operate the machine as a generator.

An example of a synchronous machine includes a direct current (DC) synchronous machine. When operating as a generator, the DC synchronous machine is configured to supply direct current to one or more loads such as avionics equipment or motor driven loads on an aircraft. When operating as a motor, the DC synchronous machine is coupled to a DC power source in order to supply motive power to a device with moving parts, such as the starter function, or a pump or compressor.

The DC synchronous machine includes an AC field winding on the rotating portion and a DC armature winding on the stationary portion. Current supplied to the AC field winding generates a magnetic field between the rotating portion and the stationary portion, causing direct current to be generated at the DC armature winding. Commutation of the AC field winding in DC synchronous machines typically requires one or more position sensors, such as resolver or Hall Effect devices, in order to synchronize a frequency of current supply with angular rotation of the rotor. There are complexities associated with integrating position sensors into electrical system.

SUMMARY

An assembly for power generation, according to an exemplary aspect of the present disclosure, includes, among other things, a synchronous machine. The synchronous machine includes a stationary portion and a rotating portion. The stationary portion includes a direct current (DC) armature winding, and the rotating portion includes a rotating inverter coupled to an alternating current (AC) field winding. A carrier generator is configured to cause a carrier signal to be injected into a magnetic field between the AC field winding and the DC armature winding. A controller is configured to cause the rotating inverter to communicate alternating current to the AC field winding at a frequency that is based upon the carrier signal and is adjusted to approach synchronization with a position of the rotating portion. A method of operating a DC synchronous machine is also discussed.

The various features and advantages of disclosed embodiments will become apparent to those skilled in the art from the following detailed description. The drawings that accompany the detailed description can be briefly described as follows.

DETAILED DESCRIPTION

The disclosed embodiments of a DC synchronous machine include a control assembly configured to cause a carrier signal to be injected into a magnetic field in order to adjust current supply based on an estimated rotor position. The DC synchronous machine can be configured to operate as a motor or a generator, and the control assembly can be configured to supply the carrier signal at various locations in the DC synchronous machine as discussed below. Further embodiments of a DC synchronous machine are disclosed in co-pending U.S. patent application Ser. No. 14/683,468, entitled "DC Synchronous Machine" filed on even date herewith. Aspects of this function from the co-pending application are incorporated herein by reference.

Figure 1:
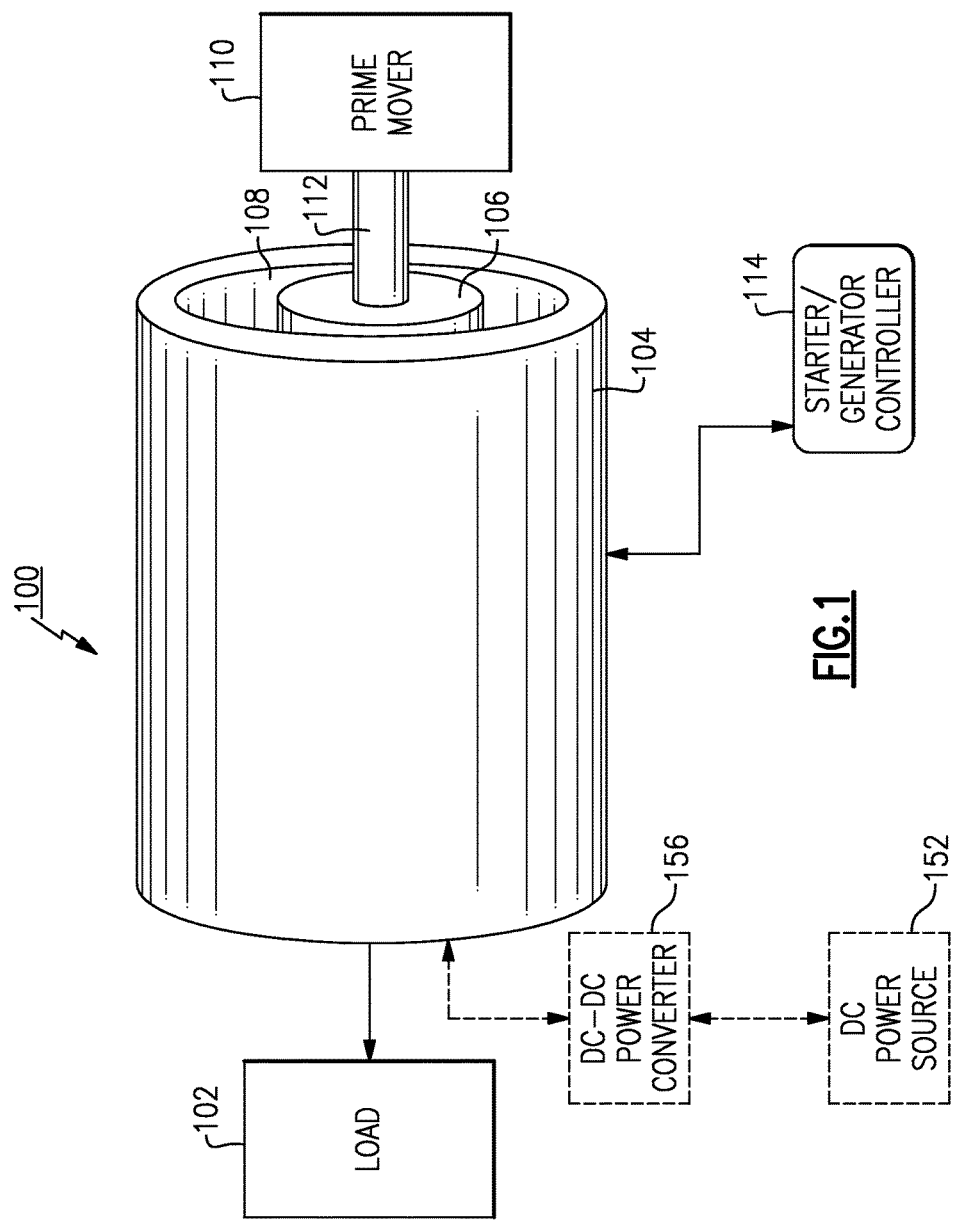
FIG. 1 illustrates a DC synchronous machine.

FIG. 1 illustrates a DC synchronous machine 100 that may be configured to supply direct current to one or more loads 102 if operating as a generator. In this disclosure, like reference numerals designate like elements where appropriate and reference numerals with the addition of one-hundred or multiples thereof designate modified elements that are understood to incorporate the same features and benefits of the corresponding original elements.

The DC synchronous machine 100 includes a stationary portion 104, or stator, arranged about a rotating portion 106, or rotor, to define an air gap 108. The rotating portion 106 can be coupled to a prime mover 110 via a shaft 112. Example prime movers 110 can include gas turbine engines for aircrafts and ground-based systems, and diesel engines. The rotating portion 106 and the stationary portion 104 include wire coils. During operation in a generator mode, a rotating magnetic field is generated by supplying current to the wire coils at the rotating portion 106 while the rotating portion 106 rotates relative to the stationary portion 104.

A controller 114 is coupled to the DC synchronous machine 100 to cause various characteristics of the rotating magnetic field to be adjusted, as discussed in detail below. The DC synchronous machine 100 can be coupled to a DC power source 152 in order to generate mechanical output in a motor mode to drive the prime mover 110. The DC synchronous machine 100 can also be configured to function in a generator mode to supply direct current to one or more loads 102. As an example, the DC synchronous machine 100 can be a starter/generator which operates to start rotation of a gas turbine engine, and then is driven by the gas turbine engine to generate current.

Figure 2:
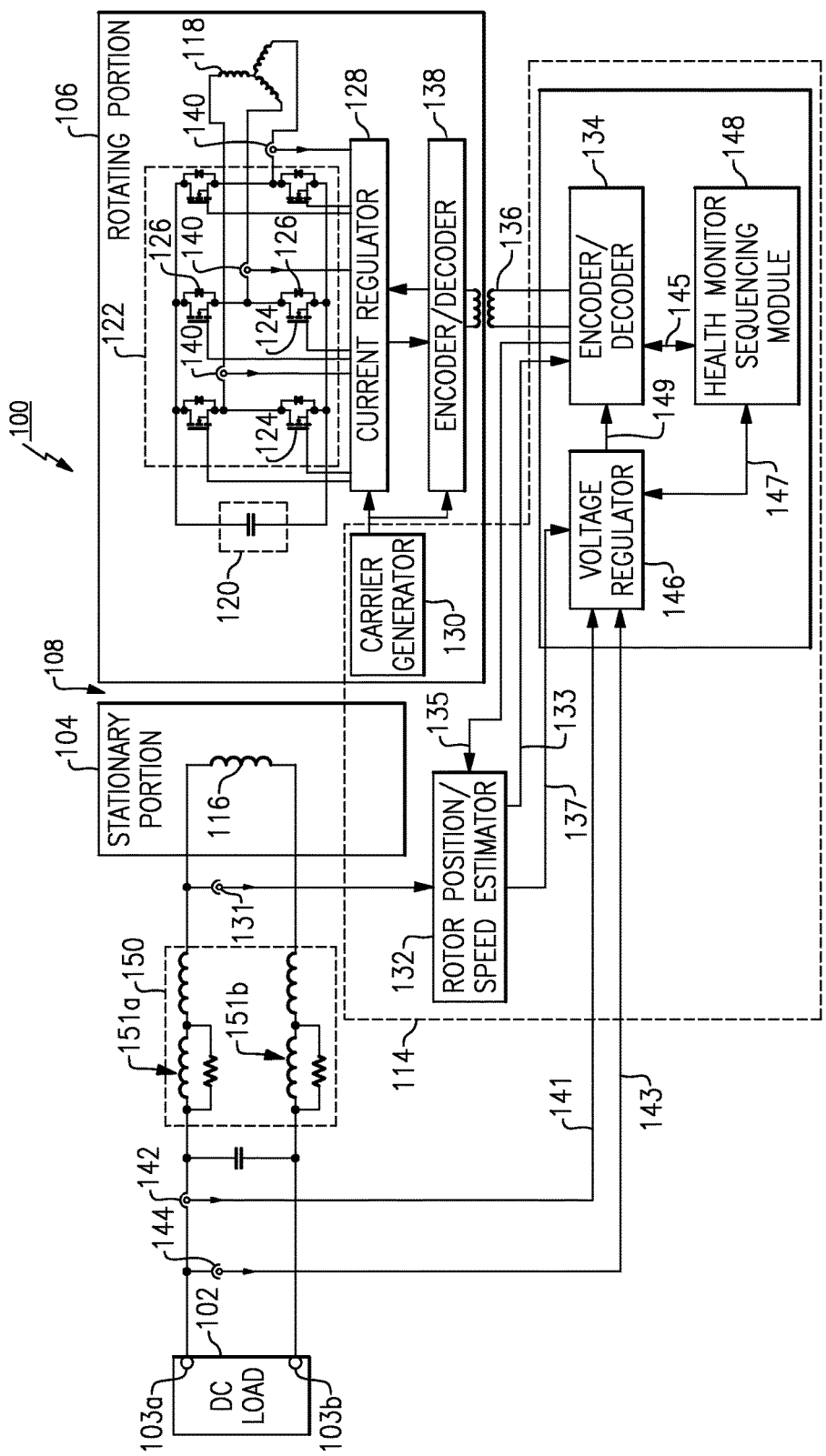
FIG. 2 schematically illustrates a controller for the DC synchronous machine of FIG. 1.

Referring to FIG. 2, the stationary portion 104 includes a stator armature winding 116, and the rotating portion 106 includes a three-phase alternating current (AC) field winding 118. Although a three-phase AC field winding is shown, any number of phases can be utilized with the teachings herein.

A rotor energy source 120 is configured to energize the AC field winding 118 in order to induce a magnetic field between the AC field winding 118 and a stator armature winding 116. In the illustrative embodiment, the rotor energy source 120 is a rechargeable energy source, such as a supercapacitor (shown) or lithium ion battery, located at the rotating portion 106. The rechargeable rotor energy source 120 is configured to operate in charge and supply modes. During supply mode, power is supplied from the rotor energy source 120 to the AC field winding 118. During charge mode, power is supplied to the rotor energy source 120 from the AC field winding 118 by injecting high frequency power into the stator armature winding 116. Further embodiments for the configuration and operation of a rechargeable rotor energy source are disclosed in co-pending U.S. patent application Ser. No. 14/683,468. Aspects of this function from the co-pending application are incorporated herein by reference. In alternative embodiments, the rotor energy source 120 is a synchronous exciter, a permanent magnet exciter, or a high frequency transformer, for example.

A supply of direct current from the rotor energy source 120 is communicated to a rotating inverter 122 configured to convert direct current to alternating current. The rotating inverter 122 can include transistor(s) 124 and diode(s) 126 configured to selectively provide a supply of alternating current to the AC field winding 118.

Communication of alternating current from the rotating inverter 122 to the AC field winding causes the rotating magnetic field to be generated between the AC field winding 118 and the stator armature winding 116. The rotating magnetic field induces a current in the stator armature winding 116 to generate DC output at terminal 103a, 103b.

The rotating portion 106 can include a current regulator 128 configured to selectively adjust a frequency of current communicated from the rotating inverter 122 to the AC field winding 118. The current regulator 128 can be coupled to one or more current sensors 140 to determine a current output at each phase of the rotating inverter 122. The current regulator 128 can selectively adjust the current supply from the rotating inverter 122 to the AC field winding 118 based on the current output at each phase of the rotating inverter 122 and rotor position information determined by the controller 114. The controller 114 is configured to alter current supplied to the rotating inverter 122 such that a frequency of the supply current is synchronized with a position of the rotating portion 106, shaft 112, or the rotating magnetic field relative to the stationary portion 104.

A feedback arrangement is utilized to determine the position of the rotating portion 106. A carrier generator 130 is configured to generate a carrier signal at a predetermined frequency. The carrier generator 130 injects the carrier signal at a location of the DC synchronous machine 100, such as the current regulator 128, for example. The current regulator 128 is configured to communicate the carrier signal to the rotating inverter 122, such that the carrier signal is injected into the rotating magnetic field. The DC synchronous machine 100 can include an output filter 150, such as one or more low-pass filters 151a, 151b, configured to filter the high frequency carrier signals such that the signals do not interrupt the DC load 102.

The controller 114 also includes a rotor position/speed estimator 132 configured to determine rotor position. Rotor position/speed estimator 132 is coupled to voltage sensor 131 to obtain a voltage signal at the stator armature winding 116. The obtained voltage signal contains angular information about the rotating portion 106 at a frequency of the carrier signal. An encoder/decoder 134 communicates the carrier signal to the rotor position/speed estimator 132 via signal line 135. The rotor position/speed estimator 132 is configured to isolate the measured voltage signal at the carrier frequency to determine the position of the rotating portion 106. Various techniques for estimating the position of the rotating portion 106 are described below with reference to FIGS. 6-8.

The position information is communicated from the rotor position/speed estimator 132 to an encoder/decoder 134 via signal line 133. The encoder/decoder 134 translates the information in a format to allow a communication transformer 136 to supply the information across the air gap 108 to an encoder/decoder 138 located at the rotating portion 106. The encoder/decoder 138 communicates the rotor position information to the current regulator 128. The current regulator 128 is configured to utilize the rotor position information to selectively adjust a frequency of current communicated from the rotating inverter 122 as previously discussed. The controller 114 is configured to determine a position of the rotating portion 106 without the use of position sensors, thereby reducing system complexity.

The controller 114 can include a voltage regulator 146 configured to receive signals from current sensor(s) 142 via signal line 141, and signals from voltage sensor(s) 144 via signal line 143. The voltage regulator 146 can also be configured to receive signals from the rotor position/speed estimator 132 via signal line 137. The voltage regulator 146 can be configured to monitor DC power supplied from a DC power source 152 (shown in FIG. 1) to the DC synchronous machine 100, as well as other operating conditions from a health monitor sequencing module 148, for example, such as current magnitude. The monitored information can be communicated from the voltage regulator 146 to the encoder/decoder 134 via signal line 149, transferred from the communication transformer 136 to encoder/decoder 138 and then to the current regulator 128. The current regulator 128 can utilize this information in order to adjust current supply to achieve desired output voltage generated at the stator armature winding 116.

The controller 114 can also include a health monitor sequencing module 148 configured to receive one or more signals from the voltage regulator 146 at signal line 147 to monitor output voltage and power supply, and the encoder/decoder at signal line 145 to monitor field current at the AC field winding 118, for example. The health monitor sequencing module 148 can be configured to monitor operation and status of the DC synchronous machine 100, such as operating temperature. The health monitor sequencing module 148 can also be configured to inform other systems of various conditions of the DC synchronous machine 100, such as fault conditions or low-power conditions and the like.

In operation, the controller 114 utilizes the carrier signal to determine a position of the rotating portion 106 in order to inform the current regulator 128. The current regulator 128 selectively controls current supplied from the rotating inverter 122 to the AC field winding 118 such that the frequency of the current is synchronized with the position of the rotating portion 106. Synchronization refers to adjusting current supplied to each phase of a field winding to cause the wave cycles per second (frequency, Hz) of the current at each phase to be equivalent to the revolutions per second (angular frequency, $\omega$) of a rotor. Current through the AC field winding 118 generates a magnetic field, which induces current in the stator armature winding 116 to generate DC output. The current regulator 128 also selectively controls current supplied from the rotating inverter 122 to the AC field winding 118 based on system conditions, such as a desired or sensed output voltage at the stator armature winding 116.

Figure 3:
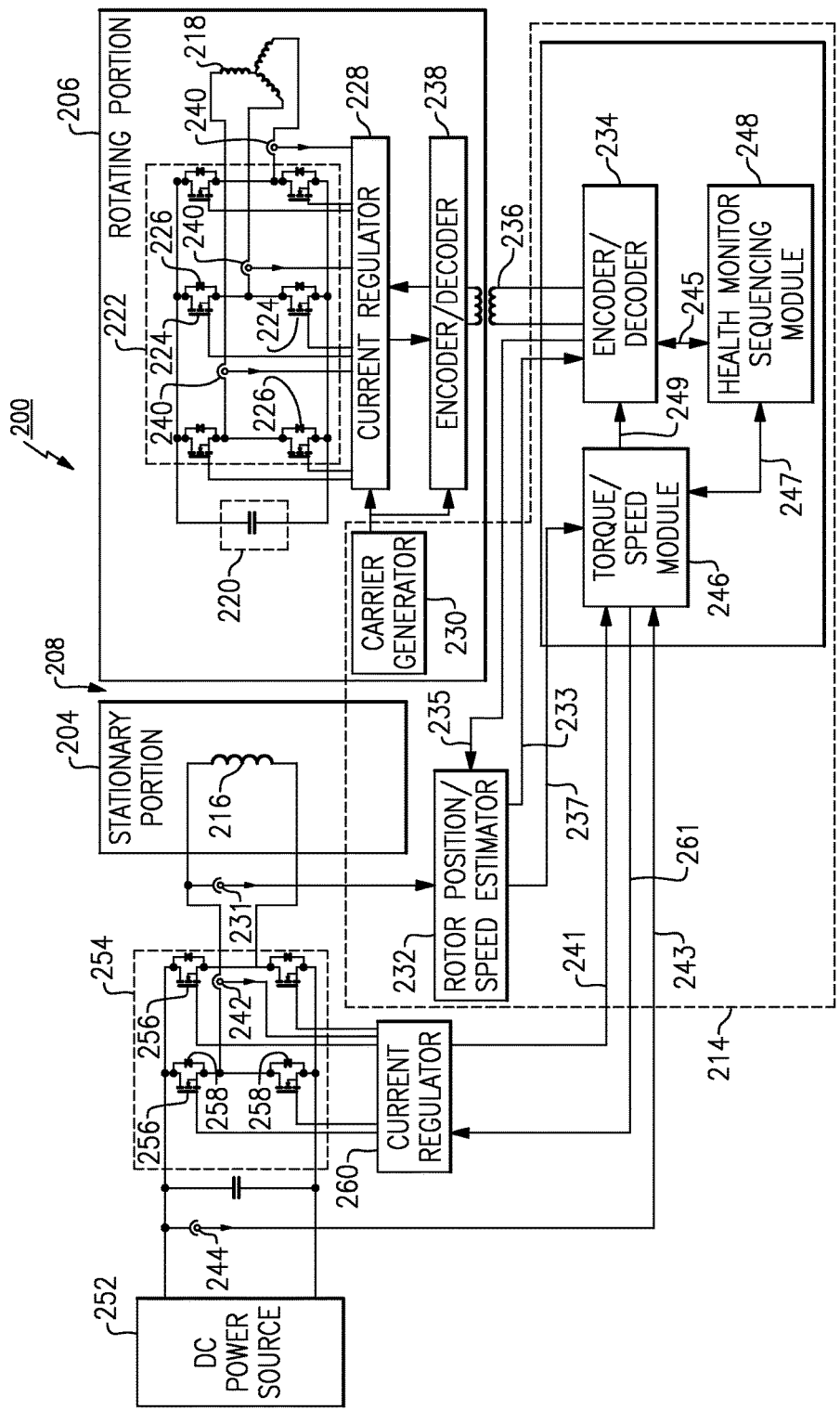
FIG. 3 schematically illustrates a controller for a DC synchronous machine.

FIG. 3 illustrates a second embodiment of a DC synchronous machine 200 configured to operate in a motor mode to generate mechanical output, such as for providing torque to a pump or compressor. In this embodiment, the DC synchronous machine 200 is configured to obtain power from a DC power source 252 coupled to an H-bridge circuit 254, for example. The H-bridge circuit 254 can include transistor(s) 256 and diode(s) 258, for example, and is configured to selectively adjust current supplied from the DC power source 252 to a stator armature winding 216. A current regulator 260 is configured to control current in the DC winding 216 in response to a current command on line 261 from a torque/speed module 246.

A controller 214 can include the torque/speed module 246 configured to receive signals from current sensor(s) 242 via signal line 241 and voltage sensor(s) 244 via signal line 243. The torque/speed module 246 can be configured to control torque and speed of a shaft 112 (shown in FIG. 1) caused by mechanical output generated by DC synchronous machine 200, as well as to communicate the current command to the rotating current regulator 228. The current command can be communicated to a current regulator 260 via signal line 261 in order to achieve field weakening operation above a motor base speed of the DC synchronous machine 200.

The controller 214 can also include a health monitor sequencing module 248 configured to receive signals from the torque/speed module 262 from signal line 247. The health monitor sequencing module 248 can be configured to monitor operation and status of the DC synchronous machine 200. The health monitor sequencing module 248 can also be configured to inform other systems of system conditions such as fault conditions, provide built-in-test and start/stop commands, for example.

In operation, the DC power source 252 supplies current to the stator armature winding 216 in order to generate a first magnetic field. The first magnetic field can be controlled by the current regulator 260 based on various system conditions, such as a desired output mechanical energy. The current regulator 260 selectively controls the H-bridge 254 to adjust current supplied from the DC power source 252 to the stator armature winding 216. Simultaneously, a rotor energy source 220 communicates current to the rotating inverter 222. The controller 214 utilizes a carrier signal to determine the position of the rotating portion 206 in order to inform the current regulator 228 as described above. The current regulator 228 is configured to selectively control current supplied from the rotating inverter 222 to the AC field winding 218 such that the frequency of current supply is synchronized with a position of the rotating portion 206. Current supply to the AC field winding 218 generates a second magnetic field. Interactions between the first and second magnetic field cause the rotating portion 206 to rotate and provide mechanical energy to drive a shaft 112 (shown in FIG. 1), for example.

Figure 4:
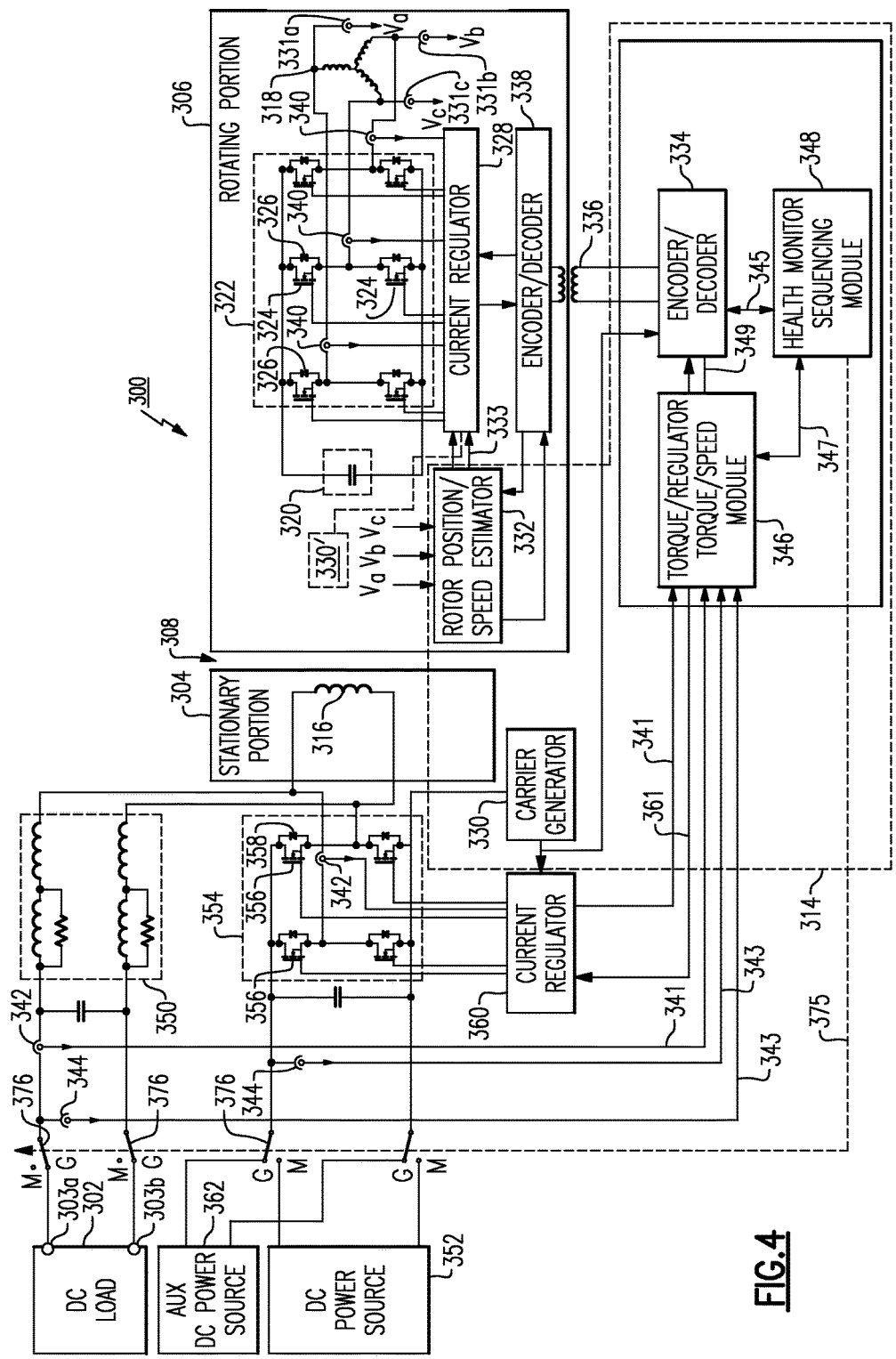
FIG. 4 schematically illustrates a third embodiment of a controller for a DC synchronous machine.

FIG. 4 illustrates a third embodiment of a DC synchronous machine 300 configured to operate in generator and motor modes. One or more switches 376 selectively couple a load 302 to the DC synchronous machine 300. One or more switches 376 also selectively couple a DC power source 352 and an auxiliary DC power source 362 to the DC synchronous machine 300. The position of switches 376 determine whether the DC synchronous machine 300 operates in a generator mode or a motor mode. As shown, the switches 376 are arranged such that the DC synchronous machine 300 operates in a generator mode. The relatively lower power auxiliary DC power source 362 can be configured to supply power to the H-bridge 354 when the DC synchronous machine 300 is operating in a generator mode and does not require the high power capability of DC power source 352. A health monitor sequencing module 348 is coupled to the switches 378 via signal line 375, and is configured to selectively actuate the switches 378 such that the DC synchronous machine 300 operates in the desired mode.

A carrier generator 330 injects a carrier signal into the DC synchronous machine 300 at a current regulator 360, for example, which communicates the carrier signal through an H-bridge circuit 354 and to a stator armature winding 316. High frequency current induced in the stator armature winding 316 induces a current through the AC field winding 318 on the rotating portion 306. Voltage sensors 331$a$, 331$b$, 331$c$ are located at the AC field winding 318 are configured to measure voltage for each of the phases. The three phase voltage signals are communicated to a rotor position/speed estimator 332.

In the illustrative embodiment, the rotor position/speed estimator 332 is located at a rotating portion 306. In alternative embodiments the rotor position/speed estimator 332 can be located on the stationary portion 304 or another location. The rotor position/speed estimator 332 is configured to determine a position of the rotating portion 306 and inform a current regulator 328. The current regulator 328 is configured to adjust current supplied from a rotating inverter 322 by a rotor energy source 320 based on the estimated position of the rotating portion 306 and a desired current magnitude commanded by a voltage regulator/torque-speed module 347 via encoder/decoder modules 334 and 338.

In operation, current through the AC field winding 318 generates a first magnetic field. The controller 314 utilizes a carrier signal injected into the magnetic field to determine the position of the rotating portion 306 in order to inform the current regulator 328. The current regulator 328 selectively controls current supplied from the rotating inverter 322 to the AC field winding 318 such that the frequency of current supply is synchronized with position of the rotating portion 306.

In operation as a generator, the first magnetic field induces a current in the stator armature winding 316 to generate DC output to a load 302. The current regulator 328 also selectively controls current supplied from the rotating inverter 322 to the AC field winding 318 based on various system conditions, such as desired output voltage.

In operation as a motor, the DC power source 352 supplies current to a stator armature winding 316 in order to generate a second magnetic field. The second magnetic field can be controlled by the current regulator 360 based on system conditions, such as output mechanical energy measured by the torque applied to a shaft 112 (shown in FIG. 1). Interactions between the first and second magnetic fields cause the rotating portion 306 to rotate and provide mechanical energy to drive the shaft 112 (shown in FIG. 1), for example.

In alternative embodiments, the DC synchronous machine is configured to operate in either generator mode or motor mode as shown in FIG. 4, but is configured to have a carrier generator 330' inject the carrier signal into the rotating portion 304 similar to FIGS. 2 and 3.

Figure 5:
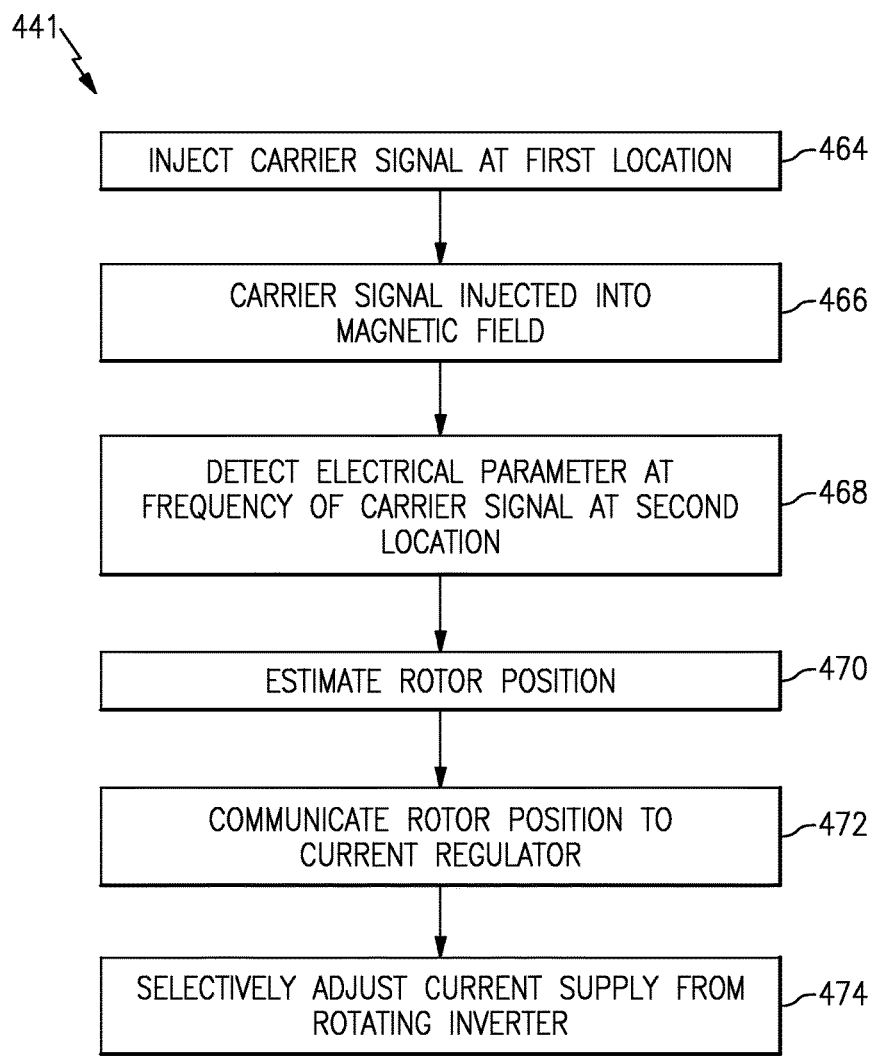
FIG. 5 shows a method of adjusting current supply based on rotor position.

FIG. 5 illustrates a method 441 in a flowchart for adjusting various characteristics of a rotating magnetic field of a DC synchronous machine, such as DC synchronous machines 100, 200, and 300. At step 464, a carrier signal is injected into a first location of a DC synchronous machine, such as an AC field winding or a stator armature winding. The carrier signal has a known frequency and can be generated by a carrier generator. At step 466, current flow through a winding at a first location causes the carrier signal to be injected into a rotating magnetic field, where the magnetic field induces a current in a second winding.

At step 468, an electrical parameter at the carrier signal frequency is detected at a second location, such as the second winding. This electrical parameter can be voltage, for example. At step 470, rotor position is estimated by evaluating the electrical parameter at the predetermined carrier frequency. At step 472, the rotor position information is communicated to a current regulator. At step 474, the current regulator selectively adjusts the current supply from a rotating inverter such that a frequency of current supply is synchronized with the rotor position.

Figure 6:
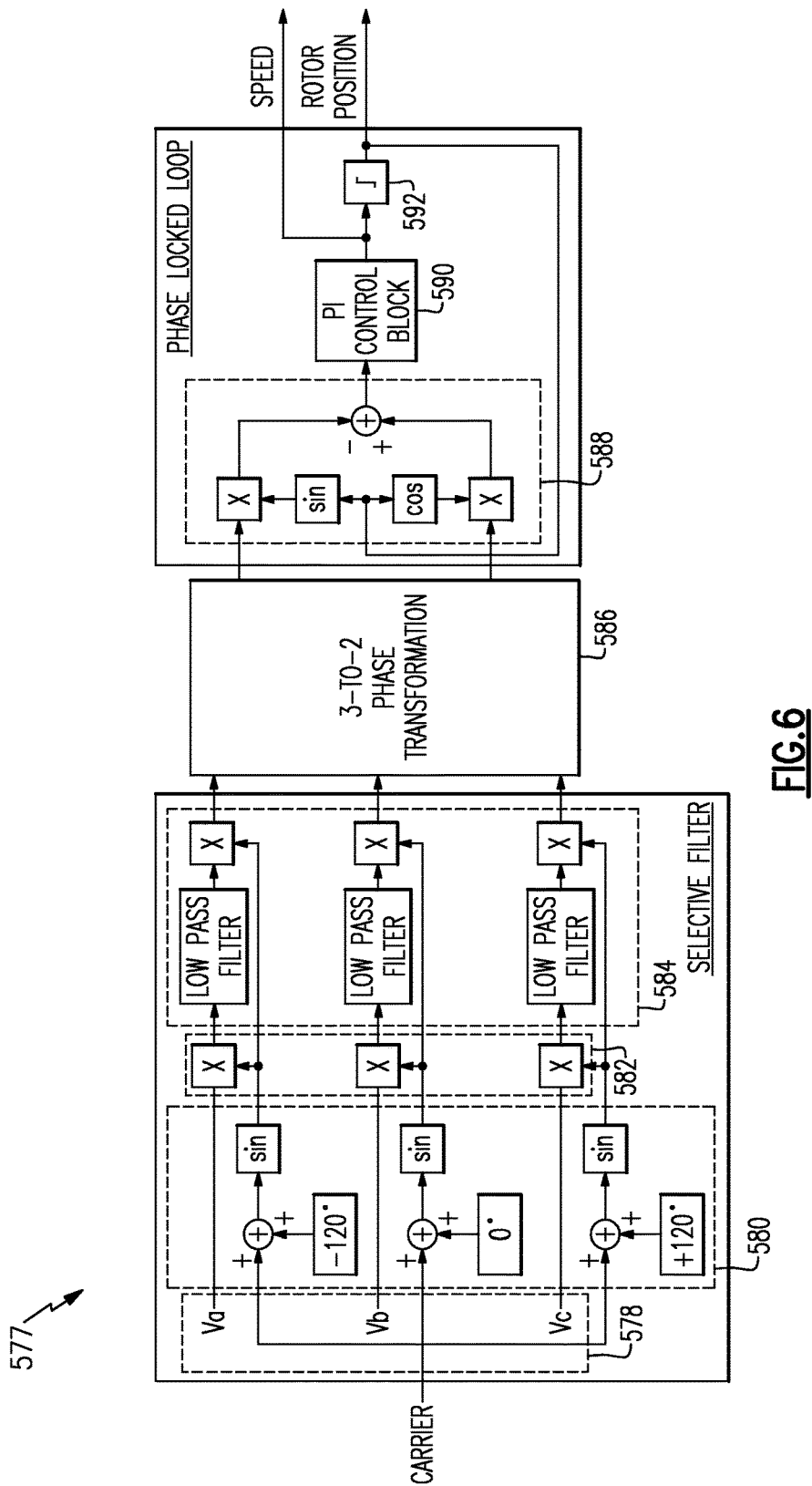
FIG. 6 shows a method of estimating rotor position.
Figure 7:
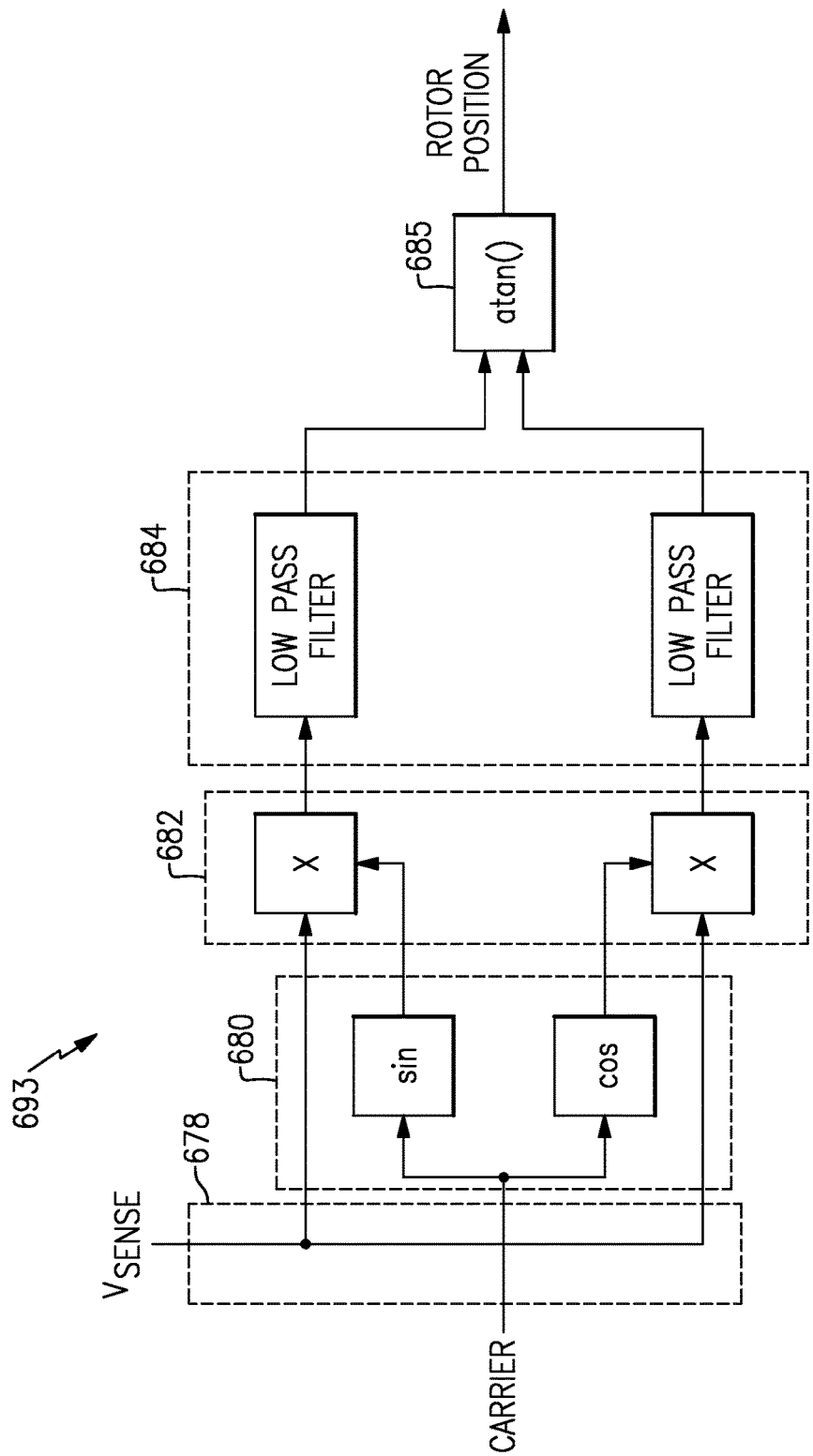
FIG. 7 shows a second method of estimating rotor position.
Figure 8:
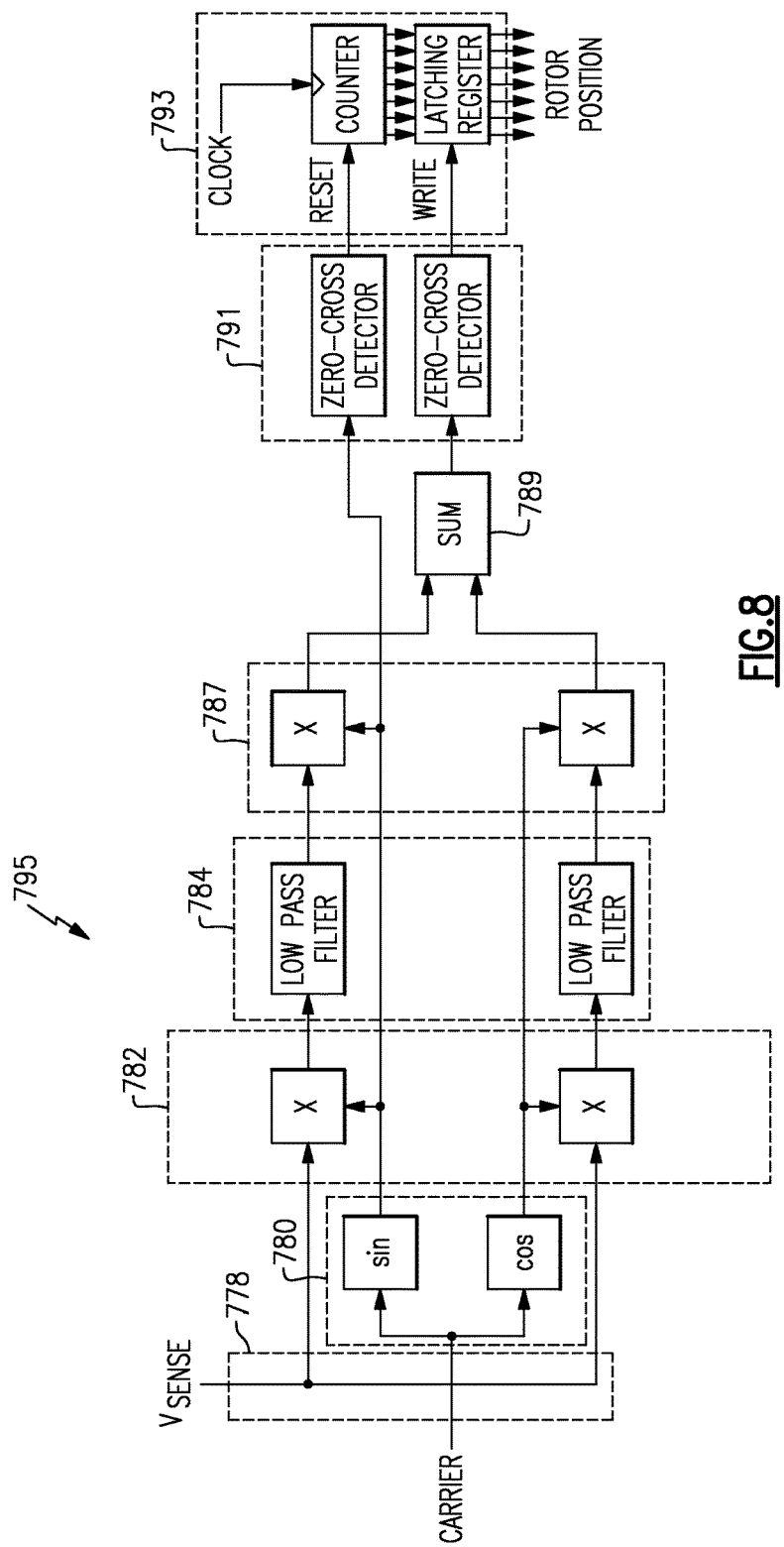
FIG. 8 shows a third method of estimating rotor position.

FIGS. 6-8 illustrate various techniques for estimating rotor position at step 470 of FIG. 5, utilizing the rotor position estimator 132, 232, 332, for example. FIG. 6 illustrates a method 577 for estimating position of the rotating portion when a carrier signal having a known frequency is injected into a stator armature winding. At step 578, three-phase voltages Va, Vb, Vc are measured at a main field winding. The three-phase voltages Va, Vb, Vc contain rotor position information at the carrier frequency. At step 580, the triangular carrier signal is modulated to output a sinusoidal modulating signal. The sinusoidal modulating signal is combined with Va at step 582, and the combined signal is passed through a low pass filter at step 584 and combined with the sinusoidal modulating signal. This process is repeated for Vb and Vc. The sinusoidal signals at the output of step 584 are then transformed from 3-phase to 2-phase at step 586. The sine and cosine components of the 2-phase signal are processed by a phase locked loop that include steps 588, 590 and 592. At step 590, the speed signal is selected using a proportional integral (PI) controller to estimate a speed of the rotating portion. At step 592, the output from step 590 is integrated to estimate rotor position.

FIG. 7 illustrates a method 693 of estimating rotor position when a carrier signal having a predetermined frequency is injected into an AC field winding. At step 678, a voltage signal (Vsense) is obtained at a DC armature winding containing rotor position information at the carrier frequency. At step 680, the carrier signal is modulated to output sine and cosine modulating signals. At step 682, these signals are combined with the voltage signal received at step 678, and then passed through a low pass filter at step 684. At step 685, rotor position is determined based on an output of an arctangent function using the signal components, or Fourier coefficients, determined at step 684.

FIG. 8 illustrates an alternative method 795 of estimating rotor position when a carrier signal having known frequency is injected into an AC field winding. Steps 778, 780, 782, 784 are the same as the steps in FIG. 7 to output the same signal components, or Fourier coefficients, at the output of a low pass filter. At step 787, the components are combined with the modulated carrier signal. At step 789, the sum of the components at the output of step 787 are used to reconstruct a filtered signal. At step 791, zero-cross detectors are used to determine the zero-crossing point for both the reconstructed filtered signal and the sinusoidal modulated carrier signal. The zero-crossing point for both the reconstructed filtered signal and the sinusoidal modulated carrier signal are utilized at step 793 to determine the phase difference between both signals using a counter and a latch register. The phase difference between the signals indicates the rotor position.

The controller arrangements discussed herein achieve synchronization of the rotor position and the frequency of current supplied to a DC synchronous machine, without the need for speed and position sensors. Synchronization occurs using voltage information already used in controlling the DC synchronous machine, such as the sensors used to monitor system conditions for the health monitor sequencing module 148 in FIG. 2. This reduces costs and complexity associated with traditional position sensors. While exact synchronization is preferable, this disclosure extends to attempting to approach synchronization in the disclosed manner.

Although the different examples have a specific component shown in the illustrations, embodiments of this disclosure are not limited to those particular combinations. It is possible to use some of the components or features from one of the examples in combination with features or components from another one of the examples. It should also be understood that any particular quantities disclosed in the examples herein are provided for illustrative purposes only.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

We claim:

1. A method of operating a DC synchronous machine, comprising:
    communicating a carrier signal in a rotating magnetic field between an armature winding and an AC field winding;
    estimating a position of the rotating magnetic field based upon the carrier signal; and
    adjusting current supplied to one of the armature winding and the AC field such that a frequency of the current is adjusted to approach synchronization with the position of the rotating magnetic field.

2. The method as recited in claim 1, wherein the step of communicating includes causing a carrier signal to be injected at the armature winding.

3. The method as recited in claim 2, wherein the carrier signal is also communicated to the AC field winding.

4. The method as recited in claim 3, further comprising communicating the carrier signal to a rotating inverter coupled to the AC field winding prior to the step of communicating the carrier signal in the rotating magnetic field.

5. The method as recited in claim 4, further comprising detecting the carrier signal at the AC field winding.

6. The method as recited in claim 2, wherein the step of includes evaluating one or more electrical parameter signals at a frequency of the carrier signal utilizing a selective filter and a phase locked loop.

7. The method as recited in claim 1, wherein the carrier signal is communicated to the AC field winding.

8. The method as recited in claim 7, wherein the step of estimating includes evaluating one or more electrical parameter signals at a frequency of the carrier signal utilizing Fourier coefficients and an arctangent function.

9. The method as recited in claim 7, wherein the step of estimating includes detecting a phase difference between the carrier signal and one or more electrical parameter signals at a frequency of the carrier signal.

10. The method as recited in claim 1, wherein the step of adjusting current occurs such the frequency of the current is adjusted to synchronize with the position of the rotating magnetic field.

11. The method as recited in claim 1, wherein the step of communicating includes causing a carrier signal to be injected at a rotating portion comprising the AC field winding.

12. The method as recited in claim 11, further comprising communicating the carrier signal to a rotating inverter coupled to the AC field winding prior to the step of communicating the communicating the carrier signal in the rotating magnetic field.

13. The method as recited in claim 12, wherein the rotating inverter is coupled between the AC field winding and a rotor energy source that energizes the AC field winding.

14. The method as recited in claim 1, further comprising causing the synchronous machine to operate as a generator in a first mode, and causing the synchronous machine to operate as a motor in a second mode.

15. The method as recited in claim 14, further comprising communicating the carrier signal to a rotating inverter coupled to the AC field winding, and wherein the step of detecting includes detecting the carrier signal at the armature winding in the first mode, but detecting the carrier signal at the AC field winding in the second mode.

* * * * *

UNITED STATES PATENT AND TRADEMARK OFFICE
CERTIFICATE OF CORRECTION

PATENT NO. : 10,033,252 B2  
APPLICATION NO. : 14/685879  
DATED : July 24, 2018  
INVENTOR(S) : Gregory I Rozman, Steven J. Moss and Jacek F. Gieras Page 1 of 1

It is certified that error appears in the above-identified patent and that said Letters Patent is hereby corrected as shown below:

In the Claims

In Claim 6, Column 8, Line 50; replace "step of includes" with --steps of estimating the position includes--

In Claim 10, Column 8, Line 65; replace "such the frequency" with --such that the frequency--

In Claim 12, Column 9, Line 7-8; replace "communicating the communicating the" with --communicating the--

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*